United States Patent
Kuo et al.

(10) Patent No.: US 7,322,513 B2
(45) Date of Patent: Jan. 29, 2008

(54) MULTIMEDIA INTELLIGENT BUSINESS CARD SYSTEM

(75) Inventors: Chih Jen Kuo, Milpitas, CA (US); Wei Luo, Sunnyvale, CA (US); Miao Li, Santa Rosa, CA (US)

(73) Assignee: 360 Degree Web, Inc., Santa Clara, CA (US)

( * ) Notice: Subject to any disclaimer, the term of this patent is extended or adjusted under 35 U.S.C. 154(b) by 0 days.

(21) Appl. No.: 10/493,123

(22) PCT Filed: Oct. 17, 2002

(86) PCT No.: PCT/US02/33089

§ 371 (c)(1),
(2), (4) Date: Oct. 4, 2004

(87) PCT Pub. No.: WO03/034267

PCT Pub. Date: Apr. 24, 2003

(65) Prior Publication Data

US 2005/0035195 A1    Feb. 17, 2005

(51) Int. Cl.
*G06F 17/00* (2006.01)
(52) U.S. Cl. ............... 235/375; 235/376; 235/492; 713/193; 726/9
(58) Field of Classification Search .......... 235/451, 235/376; 726/9
See application file for complete search history.

(56) References Cited

U.S. PATENT DOCUMENTS 5,987,612 A * 11/1999 Takagawa et al. ............ 726/9

(Continued)

FOREIGN PATENT DOCUMENTS

CN    1290380 A    4/2001

(Continued)

OTHER PUBLICATIONS

Office Action from CN for foreign patent application No. 02822893.6 dated Feb. 16, 2007, (7 pgs).

(Continued)

*Primary Examiner*—Seung Ho Lee
(74) *Attorney, Agent, or Firm*—Kirk D. Wong; Hickman Palermo Truong & Becker LLP (57) ABSTRACT

A multimedia intelligent business card system allows multimedia and Web content to be stored on a smart card. The invention automatically and selectively translates each file, URL, or file references as they should be when the contents of the smart card are read. The invention waits for a smart card to be inserted into a smart card reader attached to or resident in the host computer and intelligently distinguishes between a multimedia, Web-enabled, or combination smart card. A multimedia file/mp3 file/playlist or URL address is accessed from the smart card. The multimedia player required to play the accessed file/playlist or the browser required to display the accessed URL is determined and the accessed file/playlist is sent to the multimedia player and played to the user or the accessed URLA is sent to the browser and the Website is displayed to the user. The invention enables multiple auto play from multimedia files/MP3 playlist and multiple automatic connection with multiple URLs. A hotkey is defined on the host computer,for example, <F12>. If the user presses the hotkey during playback, then the invention will access the smart card for the next file, mp3 file in the playlist, or URL, if it exists.

18 Claims, 5 Drawing Sheets

U.S. PATENT DOCUMENTS

| | | |
|---|---|---|
| 6,370,629 B1 | 4/2002 | Hastings et al. |
| 6,374,356 B1 | 4/2002 | Daigneault et al. |
| 6,526,287 B1 * | 2/2003 | Lee ........................ 455/556.1 |
| 6,587,873 B1 * | 7/2003 | Nobakht et al. ............ 709/219 |
| 6,647,496 B1 * | 11/2003 | Tagawa et al. ............. 713/193 |
| 6,971,109 B1 * | 11/2005 | Williams et al. ............ 719/318 |
| 6,974,076 B1 * | 12/2005 | Siegel ........................ 235/380 |
| 7,181,626 B1 | 2/2007 | Rasmussen |

FOREIGN PATENT DOCUMENTS

| | | |
|---|---|---|
| WO | WO-99/38117 | 7/1999 |

OTHER PUBLICATIONS

Current claims in CN patent application No. 02822893.6, (2 pgs).

* cited by examiner

MULTIMEDIA INTELLIGENT BUSINESS CARD SYSTEM

BACKGROUND OF THE INVENTION

1. Technical Field

The invention relates to advertising using smart card media. More particularly, the invention relates to installing, playing, and displaying multimedia and Web content via smart cards in a computer.

2. Description of the Prior Art

In these days of electronic advertising there are a plethora of ways to reach consumers and businesses. Advertising through media such as television, radio, print, Web pages, and pop-up windows in Web browsers are but a few. These types of media reach the consumer through centralized methods, e.g., television broadcast stations and Web servers.

When advertisers want to reach the consumer through tangible media, they resort to direct mailings or physical handouts. These type of approaches are typified by an advertiser sending a CD-ROM directly to a potential client or consumer. The CD-ROM can contain multimedia advertisements, music, even photos. The CD-ROM is also ubiquitous in trade shows where vendors hand out CD-ROMs containing the same type of multimedia product showcases or company public relations.

CD-ROMs however, have become large in comparison to other recordable media

Presently, smart cards are used primarily for facilitating financial transactions. However, because smart cards include at least a limited amount of non-volatile readable and writeable memory and may also include a programmable processor, they inherently possess a capability for use in applications other than financial transactions. Storing data into a smart card, acessing that data, and activating a smart card's processor to execute a computer program all require that the smart card be interconnected with some type of reader/terminal.

Smart card technology has made impressive advances in the past few years. The cost of manufacturing smart cards has seen dramatic decreases. Smart cards come in two flavors: a processor-based smart card and a low-cost memory smart card. The form factors of these smart cards are the size of credit cards. As noted above, one of the financial applications of the higher cost processor-based smart cards is the intelligent credit card. Credit card manufacturers have embedded the smart card technology into a credit card without changing the dimensions of the standard credit card.

The use of smart card technology beyond the financial arena has been very limited. With the cost of low-cost memory smart cards decreasing because of production costs, their usefulness in high number applications are becoming attractive.

It would be advantageous to provide a multimedia intelligent business card system that allows a vendor to install multimedia and Web-based content onto a smart card that is played or displayed on a target audience'computer. It would further be advantageous to provide a multimedia intelligent business card system that plays or displays the smart card resident multimedia and Web content on the target audience's computer without operational effort by the user.

SUMMARY OF THE INVENTION

The invention provides a multimedia intelligent business card system. The system allows a vendor to install multimedia and Web-based content onto a smart card that is played or displayed on a target audience's computer. In addition, the invention automatically invokes the application programs required to play or display the smart card based multimedia and Web content on the target audience's computer.

A preferred embodiment of the invention allows multimedia and Web content to be stored on a smart card. A combination of text and files gives the vendor flexibility to place any type of multimedia and/or Web content and references in a smart card's memory. The invention automatically and selectively translates each file, URL, or file reference as they should be when the contents of the smart card are read.

The invention waits for a smart card to be inserted into a smart card reader attached to or resident in the host computer. The invention then intelligently distinguishes between a multimedia, Web-enabled, or combination smart card. A multimedia file/mp3 file/playlist or URL address is accessed from the smart card. The multimedia player required to play the accessed file/playlist or the browser required to display the accessed URL is determined. The accessed file/playlist is sent to the multimedia player and played to the user or the accessed URL is sent to the browser and the Website is displayed to the user.

If the smart card is removed the invention closes the multimedia player and/or browser.

The invention enables multiple auto play from multimedia files/MP3 playlist and multiple automatic connection with multiple URLs. A hotkey is defined on the host computer, for example, <F12>. If the user presses the hotkey during playback, then the invention will access the smart card for the next file, mp3 file in the playlist, or URL, if it exists.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a multimedia intelligent business card system. A system according to the invention allows a vendor to install multimedia and Web-based content onto a smart card that is played or displayed on a target audience's computer. In addition, the automatically invokes the application programs required to play or display the smart card based multimedia and Web content on the target audience's computer.

The invention provides an application environment on a host computer for automatically playing and/or displaying multimedia and Web content residing on a smart card.

Figure 1:
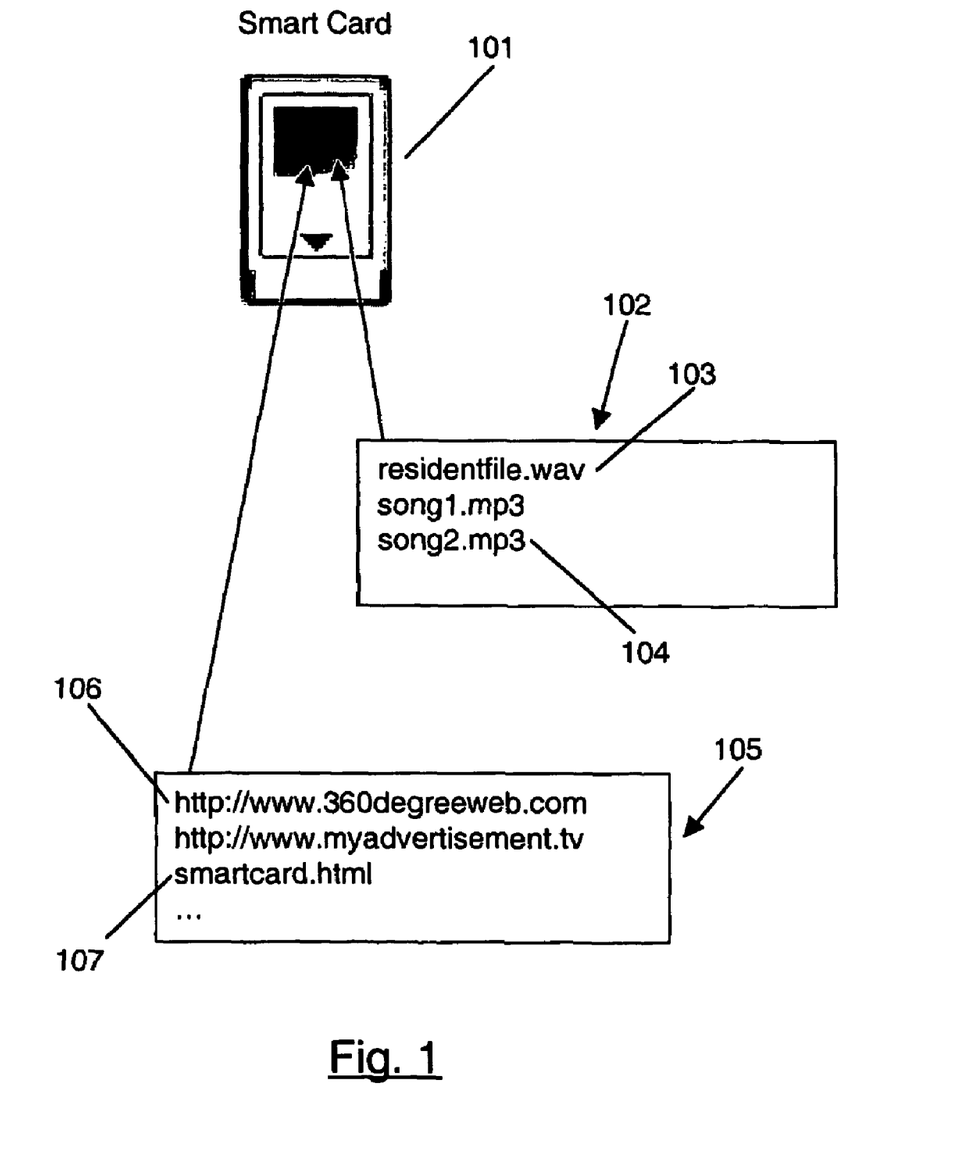
FIG. 1 is a block schematic diagram showing multimedia and Web content stored on a smart card according to the invention.

Referring to FIG. 1, the invention stores both multimedia, Web content, and file names on a smart card 101. For example, filenames such as residentfile.wav 103 can be placed on the smart card even though the file itself is resident on the host computer. Entire files such as song2.mp3 104 can be placed in the memory of the smart card. Lists of multimedia files 102 can also be placed in the smart card's memory.

The invention allows Web universal resource locators (URL) 106 to be stored on the smart card 101 as well as hypertext markup language (HTML) files 107. This combination of text and actual files gives the vendor flexibility to place any type of multimedia 102 or Web 105 content and references in a smart card's memory. The invention further allows a mix of multimedia 102 and Web 105 content to be stored in the smart card. The invention automatically and selectively translates each file, URL, or file reference as they should be when the contents of the smart card are read.

Figure 2:
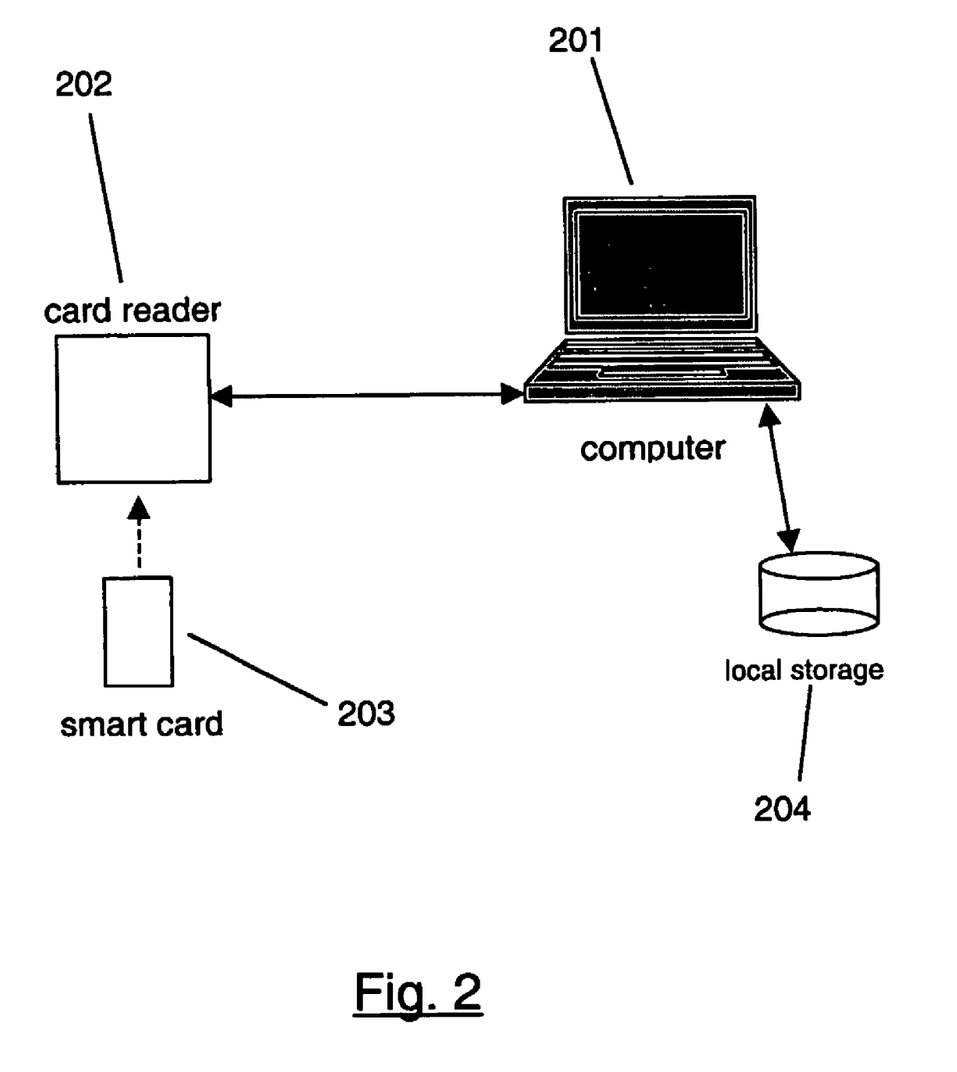
FIG. 2 is a schematic diagram showing a smart card reader connected to a computer system running the invention's application program according to the invention.

With respect to FIG. 2, the invention installs a smart card management application program on the host computer 201. The smart card management application program detects if a smart card 203 is inserted into an attached or internal smart card reader/terminal 202. The smartcard management application program determines if the smart card 203 is a multimedia/Web enabled smart card.

For example, if the smart card 203 contains a file name, the smart card management application program reads the smart card 203 and finds the file name (e.g., Disney.wav). The smart card management application program knows that it has encountered a file name and looks on the local storage 204 on the host computer 201 for the file name on a certain path or folder (e.g., MultiMedia Folder). When the file is found, the smart card management application program plays or displays the file by executing the appropriate application program for the file. The application program is passed the path to the file. Files can designate any type of music, audio, movie, or picture.

If several file names are present on the smart card 203, the smart card management application program will play each one in sequence or the user can manually sequence through the files.

The smart card 203 can also contain actual files as described above. For example, an HTML file that defines a menu can be stored on the smart card 203 along with several movie files. The smart card management application program displays the HTML menu page and plays the movie files from the smart card 203. This can apply to multi-level advertisements, brochures, movie previews, product reviews, etc.

The invention, for example, allows companies to give a person a low-cost smart card at an industry show. The smart card contains the companies' advertisements or product brochures. The person takes the smart card home or to the office and inserts the smart card into the card reader in his computer. The invention automatically plays or displays the advertisements or brochures on the smart card to the person. The invention offers a low-cost approach to targeted advertising.

The invention intelligently distinguishes between a multimedia or Web-enabled smart card. When the user inserts a smart card into the host computer's smart card reader, the invention identifies if the smart card is a multimedia card or Web-enabled card or a combination. The invention then executes the proper sequence of events for that smart card. The invention can make certain judgement calls when, for example, the smart card contains both multimedia and Web content. If the user does not have an Internet connection, the invention can play the multimedia content on the smart card.

Figure 3:
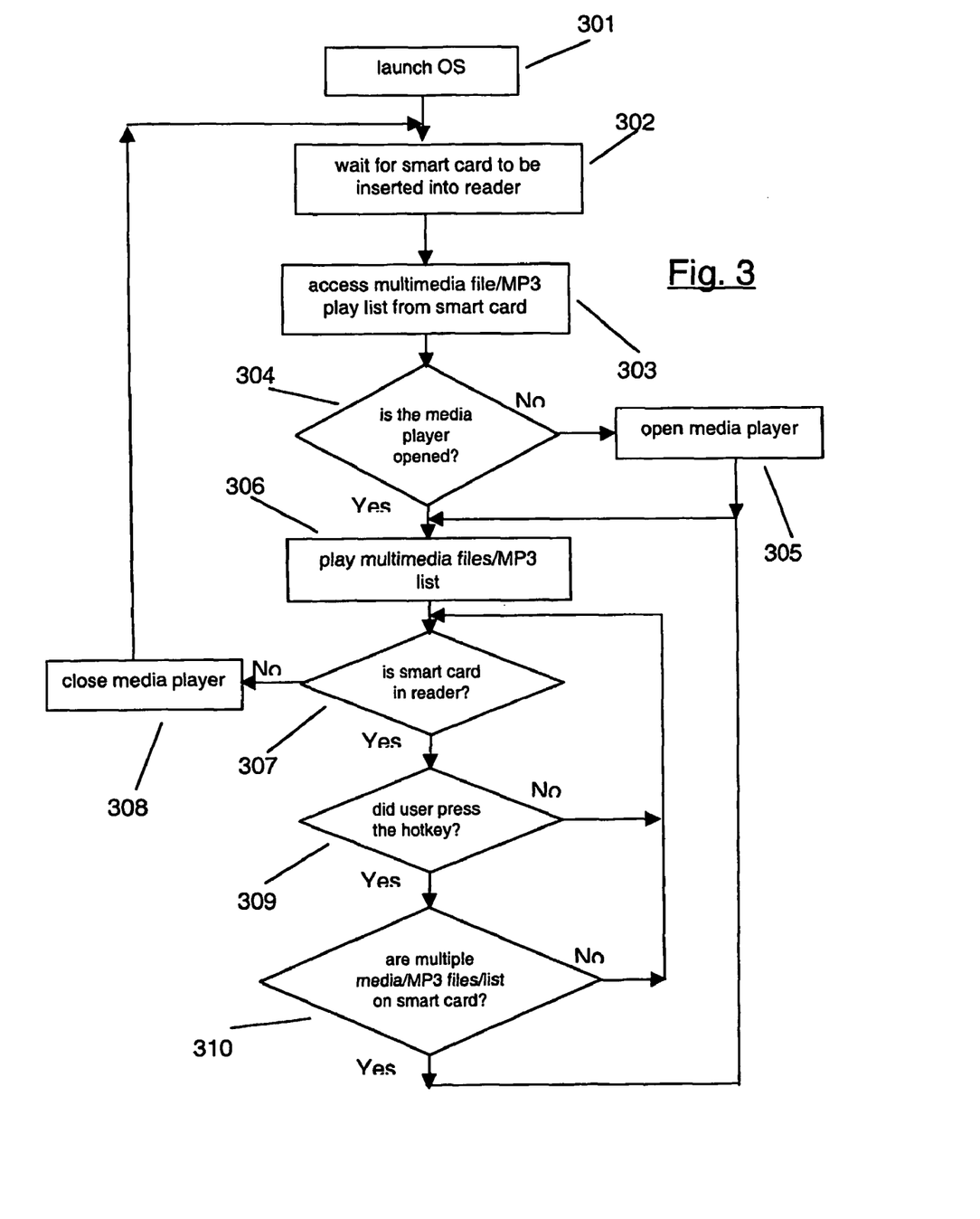
FIG. 3 is a block schematic diagram of a flowchart showing the handling of a multimedia enabled smart card according to the invention.

Referring to FIG. 3, a flowchart is shown for handling multimedia smart cards. The invention is launched after the operating system boots 301. The invention waits for a smart card to be inserted into the smart card reader attached to or resident in the host computer 302.

The invention intelligently distinguishes between a multimedia or Web-enabled smart card. Here, the smart card is a multimedia smart card. The invention accesses a multimedia file/mp3 file/playlist on the smart card 303. The multimedia player required to play the accessed file/playlist is determined and the invention checks if the multimedia player is already running 304. If the desired multimedia player is not running, then the invention starts the multimedia player 305.

The accessed file/playlist is sent to the multimedia player and played to the user 306.

If the smart card is removed during this time 307, then the invention automatically closes the multimedia player 308. It then waits for a smart card to be inserted into the card reader 302.

The invention enables multiple auto play from the multimedia files/MP3 playlist. It allows the user to define a hotkey on the host computer, for example, <F12>. If the user presses the hotkey during playback 309, then the invention looks at the smart card and accesses the next file or mp3 file in the playlist, if they exist 310. The appropriate multimedia player is started for the accessed file and the file is played 306.

Removal of the smart card or the user pressing the hotkey can occur at any time during playback and will be acted upon.

Figure 4:
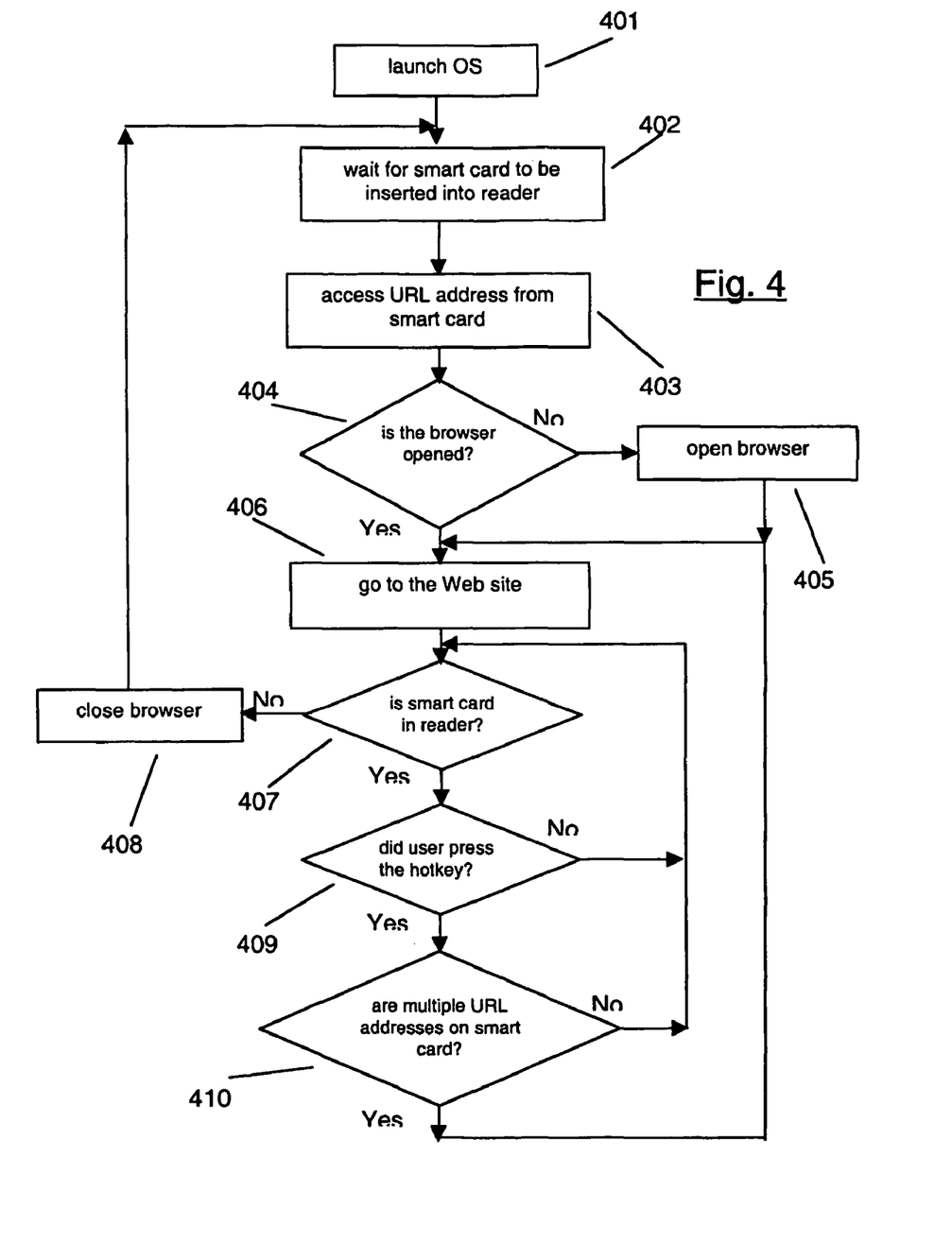
FIG. 4 is a block schematic diagram of a flowchart showing the handling of a Web enabled smart card according to the invention.

With respect to FIG. 4, a flowchart is shown for handling Web-enabled smart cards. The invention is launched after the operating system boots 401. The invention waits for a smart card to be inserted into the smart card reader attached to or resident in the host computer 402.

As noted above, the invention intelligently distinguishes between a multimedia or Web-enabled smart card. Here, the smart card is a Web-enabled smart card. The invention accesses a URL address from the smart card 403. The browser required to display the accessed URL is determined and the invention checks if the browser is already running 404. If the desired browser is not running, then the invention starts the browser 405.

The accessed URL is sent to the browser and the Website is displayed to the user 406.

If the smart card is removed during this time 407, then the invention automatically closes the browser 408. It then waits for a smart card to be inserted into the card reader 402.

The invention enables multiple automatic connection with multiple URLs. As described above, the invention allows the user to define a hotkey on the host computer, for example, <F12>. If the user presses the hotkey after display of the URL 409, then the invention looks at the smart card and accesses the next URL on the smart card, if one exists 410. The next URL is sent to the browser and the Website is displayed by the browser 406.

Removal of the smart card or the user pressing the hotkey can occur at any time during playback and will be acted upon.

Figure 5:
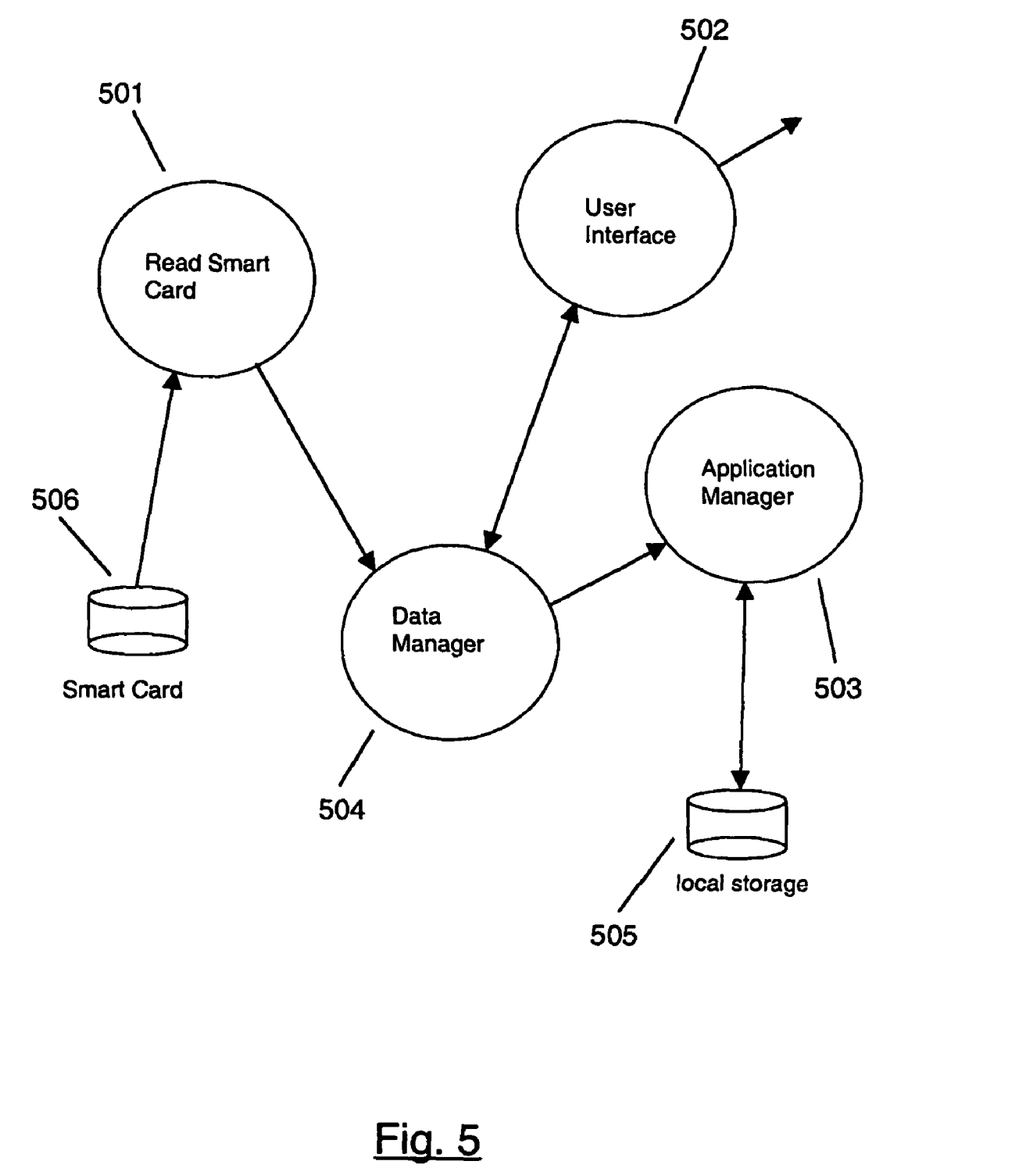
FIG. 5 is a block schematic diagram of a task-oriented viewpoint of a preferred embodiment of the invention illustrating the modules involved with identifying and processing data accessed from a smart card according to the invention.

Referring to FIG. 5, a task viewpoint of the invention is shown. The Read Smart Card module 501 waits for a smart card 506 to be inserted into the smart card reader attached to or resident in the host computer.

The Data Manager 504 intelligently distinguishes between a multimedia, Web-enabled, or combination smart card. The Data Manager module 504 accesses a multimedia file/mp3 file/playlist or URL address from the smart card via the Read Smart Card module 501. If the smart card is a combination smart card, the Data Manager 504 makes a decision as to which it will play. Some vendors may have duplicate material in both multimedia format and Web format. The choice of which to play may be dependent upon which would result in the highest quality playback as well as the most up to date. If the user has a high-speed broadband connection, then the Web content would be the most up to date. If the user does not have an Internet connection, then playing the multimedia content would be best.

The multimedia player required to play the accessed file/playlist or the browser required to display the accessed URL is determined. The Data Manager 504 checks if the multimedia player is already running through the Application Manager 503. If the desired multimedia player is not running, then the Data Manager 504 starts the multimedia player in local storage 505 via the Application Manager 503. If the desired browser is not running, then the Data Manager 504 starts the browser in local storage 505 via the Application Manager 503.

The accessed file/playlist is sent to the multimedia player and played to the user or the accessed URL is sent to the browser and the Website is displayed to the user.

If the smart card is removed during this time, then the Read Smart Card module 501 notifies the Data Manager 504 which has the Application Manager 503 close the multimedia player and/or browser. The invention then waits for a smart card to be inserted into the card reader.

The Data Manager 504 enables multiple auto play from the multimedia files/MP3playlist and multiple automatic connection with multiple URLs. The User Interface module 502 allows the user to define a hotkey on the host computer, for example, <F12>. If the user presses the hotkey during playback, then the User Interface module 502 will catch the keypress. The Data Manager 504 looks at the smart card 506 via the Read Smart Card module 501 and accesses the next file, mp3 file in the playlist, or URL, if it exists.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process for storing multimedia and Web content on a transportable electronic memory device and displaying the multimedia and Web content on a host computer, comprising:
   detecting that a transportable electronic memory device is in communication with a host computer;
   identifying multimedia content on said transportable electronic memory device;
   automatically playing multimedia content on said host computer upon said detection of said transportable electronic memory device; and
   wherein said automatically playing step further comprises:
      deciding whether to play a first multimedia content contained in said transportable electronic memory device or play a second multimedia content pointed to by a Web address contained in said transportable electronic memory device when said transportable electronic memory device contains said first multimedia content and said Web address; and
   wherein said deciding step decides whether to play said first multimedia content or said second multimedia content using any combination of criteria:
   whether said host computer has an Internet connection, whether playback of said first multimedia content or said second multimedia content would result in higher quality playback, and whether said first multimedia content or said second multimedia content is most up to date.

2. The process of claim 1, wherein said multimedia content on said transportable electronic memory device can contain any of: video files, audio files, Web files, universal resource locators (URL), music files, playlists, photos, and file references.

3. The process of claim 2, wherein the automatically playing step automatically plays multimedia content from a playlist on said transportable electronic memory device.

4. The process of claim 1, further comprising:
   determining an appropriate multimedia player required to play said multimedia content; and
   starting said appropriate multimedia player if said appropriate multimedia player is not running.

5. The process of claim 1, further comprising:
   defining a hotkey; and
   wherein a next multimedia content is played if one exists on said transportable electronic memory device when said hotkey is pressed by a user.

6. The process of claim 1, further comprising the steps of:
   identifying whether said transportable electronic memory device contains Web address(es); and
   automatically displaying Web content associated with a Web address on said host computer upon said identifying step identifying said Web address(es).

7. The process of claim 6, further comprising the steps of:
   determining an appropriate browser required to display said Web content; and
   starting said appropriate browser if said appropriate browser is not running.

8. The process of claim 7, wherein if said transportable electronic memory device is disconnected from communication with said host computer then said appropriate browser is automatically closed.

9. The process of claim 7, further comprising the step of:
   defining a hotkey; and
   wherein a next Web content is displayed if a next Web address exists on said transportable electronic memory device when said hotkey is pressed by a user.

10. An apparatus for storing multimedia and Web content on a transportable electronic memory device and displaying the multimedia and Web content on a host computer, comprising:
   a module for detecting that a transportable electronic memory device is in communication with a host computer;
   a module for identifying multimedia content on said transportable electronic memory device;
   a module for automatically playing multimedia content on said host computer upon said detection of said transportable electronic memory device; and
   wherein said automatically playing module further comprises:

a module for deciding whether to play a multimedia content contained in said transportable electronic memory device or play a multimedia content pointed to by a Web address contained in said transportable electronic memory device when said transportable electronic memory device contains said multimedia content and said Web address; and wherein said deciding module decides whether to play said first multimedia content or said second multimedia content using any combination of criteria: whether said host computer has an Internet connection, whether playback of said first multimedia content or said second multimedia content would result in higher quality playback, and whether said first multimedia content or said second multimedia content is most up to date.

11. The apparatus of claim 10, wherein said transportable electronic memory device can contain any of: video files, audio files, Web files, universal resource locators (URL), music files, playlists, photos, and file references.

12. The apparatus of claim 11, wherein the automatically playing module automatically plays multimedia content from a playlist on said transportable electronic memory device.

13. The apparatus of claim 10, further comprising:
a module for determining an appropriate multimedia player required to play said multimedia content; and
a module for starting said appropriate multimedia player if said appropriate multimedia player is not running.

14. The apparatus of claim 10, further comprising:
a module for defining a hotkey; and
wherein a next multimedia content is played if one exists on said transportable electronic memory device when said hotkey is pressed by a user.

15. The apparatus of claim 10, further comprising:
a module for identifying whether said transportable electronic memory device contains Web address(es); and
a module for automatically displaying Web content associated with a Web address on said host computer upon said identifying module identifying said Web address (es).

16. The apparatus of claim 15, further comprising:
a module for determining an appropriate browser required to display said Web content; and
a module for starting said appropriate browser if said appropriate browser is not running.

17. The apparatus of claim 16, wherein if said transportable electronic memory device is disconnected from communication with said host computer then said appropriate browser is automatically closed.

18. The apparatus of claim 16, further comprising:
a module for defining a hotkey; and
wherein a next Web content is displayed if a next Web address exists on said transportable electronic memory device when said hotkey is pressed by a user.

* * * * *